(12) United States Patent
Joucgnoux et al.

(10) Patent No.: US 11,965,908 B2
(45) Date of Patent: Apr. 23, 2024

(54) METHOD AND DEVICE FOR DETERMINING THE ROTATION FREQUENCY OF WHEELS OF VEHICLES

(71) Applicant: Aktiebolaget SKF, Gothenburg (SE)

(72) Inventors: Damien Joucgnoux, Mazières de Touraine (FR); Charlotte Vu, Parçay Meslay (FR)

(73) Assignee: Aktiebolaget SKF, Gothenburg (SE)

( * ) Notice: Subject to any disclaimer, the term of this patent is extended or adjusted under 35 U.S.C. 154(b) by 93 days.

(21) Appl. No.: 17/381,910

(22) Filed: Jul. 21, 2021

(65) Prior Publication Data

US 2022/0074964 A1 Mar. 10, 2022

(51) Int. Cl.
*G01P 3/16* (2006.01)

(52) U.S. Cl.
CPC ...................................... *G01P 3/16* (2013.01)

(58) Field of Classification Search
CPC .......................................................... G01P 3/16
See application file for complete search history.

(56) References Cited

U.S. PATENT DOCUMENTS

| 4,425,798 A | * | 1/1984 | Nagai | G01H 1/003 |
| | | | | 73/659 |
| 5,497,657 A | * | 3/1996 | Taguchi | B60C 23/062 |
| | | | | 340/448 |
| 5,541,859 A | * | 7/1996 | Inoue | G01P 3/489 |
| | | | | 702/148 |
| 2003/0080857 A1 | * | 5/2003 | Hartmann | B60C 23/061 |
| | | | | 340/425.5 |
| 2005/0061070 A1 | * | 3/2005 | Dufournier | B60C 23/062 |
| | | | | 73/146 |
| 2006/0108170 A1 | * | 5/2006 | Ishikawa | B60T 8/171 |
| | | | | 73/494 |
| 2015/0362542 A1 | * | 12/2015 | De Sanctis | B60C 23/064 |
| | | | | 702/75 |
| 2019/0329610 A1 | | 10/2019 | Hubert et al. | |

FOREIGN PATENT DOCUMENTS

CN 103241195 * 8/2013 ............. B60R 16/02

* cited by examiner

*Primary Examiner* — Alexander Satanovsky
*Assistant Examiner* — Sharah Zaab
(74) *Attorney, Agent, or Firm* — GARCIA-ZAMOR INTELLECTUAL PROPERTY LAW, LLC; Ruy Garcia-Zamor

(57) ABSTRACT

A device for determining the rotation frequency of at least one wheel of a vehicle provides a first measuring device for measuring an acceleration value of the at least one wheel, a second measuring means for measuring vibrations of the at least one wheel, and a processing unit configured to determine a first rotation frequency of the at least one wheel from the measured acceleration value of the at least one wheel, compare the determined first rotation frequency of the at least one wheel to a first threshold, define a frequency analysis interval from the determined first rotation frequency greater than the first threshold, process a frequency analysis of a signal indicative of vibrations of the at least one wheel for the frequencies inside the frequency analysis interval, and select a second rotation frequency in the frequency analysis interval having the higher amplitude.

10 Claims, 2 Drawing Sheets

METHOD AND DEVICE FOR DETERMINING THE ROTATION FREQUENCY OF WHEELS OF VEHICLES

CROSS-REFERENCE TO RELATED APPLICATIONS

This application claims priority to German Patent Application no. 102020211197.9, filed Sep. 7, 2020, the contents of which is fully incorporated herein by reference.

TECHNICAL FIELD OF THE INVENTION

The present invention relates to the determination of the rotation frequency of wheels, and more particularly to a device and a method for determining the rotation frequency of wheels of vehicles.

BACKGROUND OF THE INVENTION

In vehicles, for example trucks, buses or trailers, it is often necessary to monitor several elements in order to detect damages or wear.

One of these elements may be for example a wheel used in a truck. In such a wheel, a bearing supporting the wheel may be provided with a sensor which may be used for detecting a failure of such a bearing.

In order to miniaturize the sensor and to reduce the cost of such a sensor, the sensor is configured to achieve two functions. The sensor is configured to determine a rotational speed of the wheel and to determine vibrations of the wheel.

The document US2019/0329610 discloses such a sensor comprising a piezoelectric element to measure vibration of the wheel and a determination unit for determining the rotational speed and the vibration of the wheel using the signal of the single sensor.

The determination unit performs a frequency analysis on the signal of the single sensor to determine rotational speed of the wheel.

However, the determination of the rotational speed is not reliable enough. It has been observed that on some vehicles the determined rotational speed is twice the real rotational speed of the wheel.

To determine the rotational speed of a wheel, an accelerometer may be used.

However, the determined speed is not accurate enough to perform a frequency analysis on a signal delivered by the accelerometer in order to determine vibrations generated by the wheel.

SUMMARY OF THE INVENTION

There is a need to avoid at least some of the previously mentioned drawbacks, especially by determining more accurately the rotational speed of the wheel to perform a reliable vibration analysis in order to detect a wheel bearing damage.

According to an aspect, a method for determining the rotation frequency of at least one wheel of a vehicle.

The Method Comprises:
determining a first rotation frequency of the at least one wheel from an acceleration value of the at least one wheel,
comparing the determined first rotation frequency of the at least one wheel to a first predetermined threshold,
defining a frequency analysis interval from the determined first rotation frequency greater than the first threshold,
processing a frequency analysis of a signal indicative of vibrations of the at least one wheel for the frequencies inside the frequency analysis interval, and
selecting a second rotation frequency in the frequency analysis interval having the higher amplitude, the second rotation frequency being equal to the rotation frequency of the at least one wheel.

Advantageously, defining a frequency analysis interval comprises defining a lower bound of the frequency analysis interval and a upper bound of the frequency analysis interval, the lower bound being equal to the determined first rotation frequency minus a second predetermined threshold and the upper bound being equal to the determined first rotation frequency plus the second threshold.

Preferably, processing the frequency analysis comprises implementing a Goertzel algorithm.

Preferably, determining a first rotation frequency comprises determining a first distance equal to the distance between the centre of the at least one wheel and first means for measuring the acceleration value, and computing the first rotation frequency equal to $$\frac{\sqrt{\frac{\text{acceleration value}}{\text{first distance}}}}{2\pi}.$$

In another aspect, a device for determining the rotation frequency of at least one wheel of a vehicle is proposed.

The Device Comprises:
first measuring means for measuring an acceleration value of the at least one wheel,
second measuring means for measuring vibrations of the at least one wheel, and
a processing unit configured to:
determine a first rotation frequency of the at least one wheel from the measured acceleration value of the at least one wheel,
compare the determined first rotation frequency of the at least one wheel to a first threshold,
define a frequency analysis interval from the determined first rotation frequency greater than the first threshold,
process a frequency analysis of a signal indicative of vibrations of the at least one wheel for the frequencies inside the frequency analysis interval, and
select a second rotation frequency in the frequency analysis interval having the higher amplitude, the second rotation frequency being equal to the rotation frequency of the at least one wheel.

Preferably, the processing unit is configured to define a lower bound of the frequency analysis interval and a upper bound of the frequency analysis interval, the lower bound being equal to the determined first rotation frequency minus a second threshold and the upper bound being equal to the determined first rotation frequency plus the second threshold.

Advantageously, the device further comprises energy storage means for suppling the process unit.

Preferably, the processing unit is configured to transmit wirelessly the second rotation frequency.

Advantageously, the processing unit is configured to detect a failure of a bearing supporting the wheel according to the value of the rotation frequency of the at least one wheel and a signal indicative of vibrations delivered by the second measuring means.

In another aspect, a wheel of a vehicle comprising a device as defined above is proposed.

BRIEF DESCRIPTION OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
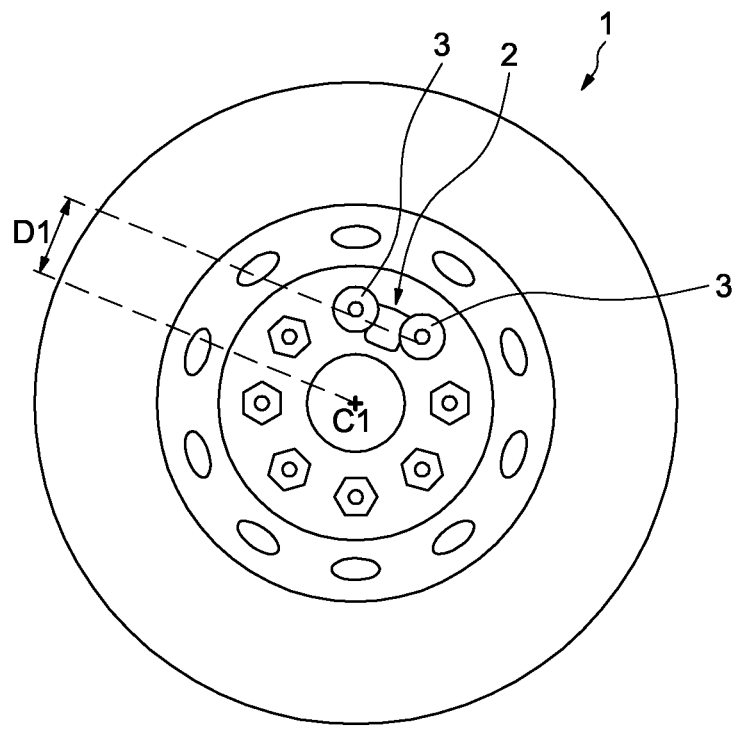
FIG. 1 illustrates schematically an example of a wheel according to the invention.

Reference is made to FIG. 1 which represents an example of a wheel 1 of a vehicle.

The vehicle may be for example a truck, a bus or a trailer.

A device 2 for determining the rotation frequency of the wheel 1 is disposed on the wheel 1.

The device 2 is for example fasten on nuts 3 of the wheel 1 and is distant from the centre C1 of the wheel 1 from a first distance D1.

Figure 2:
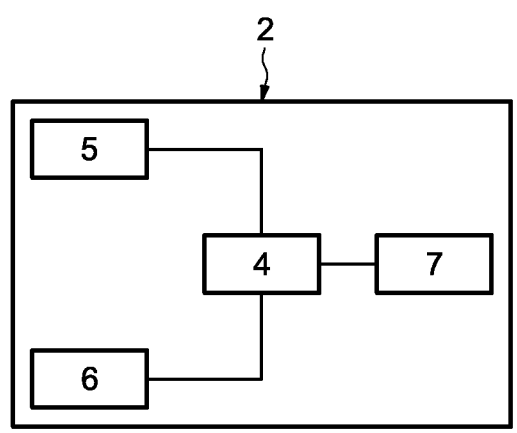
FIG. 2 illustrates schematically an embodiment of a device for determining the rotation frequency of the wheel.

FIG. 2 discloses an example of an embodiment of the device 2.

The device 2 comprises first measuring means for measuring an acceleration value of the wheel 1, second measuring means for measuring vibrations of the wheel 1, and a processing unit 4.

The first measuring means comprise for example an accelerometer 5 connected to the processing unit 4 and the second measuring means comprise for example a vibrations sensor 6 connected to the processing unit 4.

The device 2 may further comprise energy storage means for suppling the process unit 4, the energy storage means may for example comprise a battery 7.

The device 2 does not need an external power supply and is autonomous.

Figure 3:
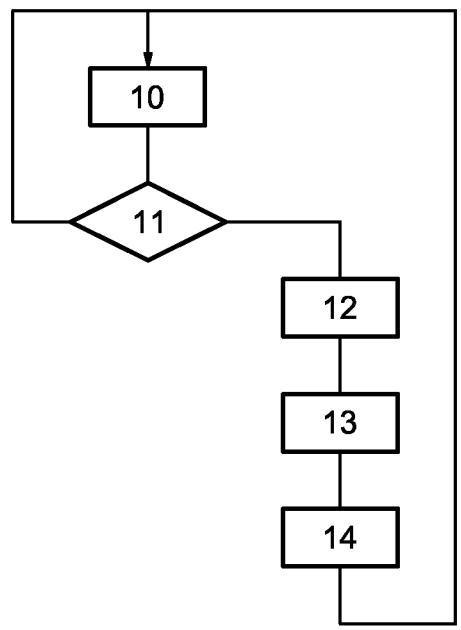
FIG. 3 illustrates a method for determining the rotation frequency of the wheel.

FIG. 3 represents an embodiment of a method for determining the rotation frequency of the wheel 1.

In a step 10, the accelerometer 5 measures an acceleration value VAL of the wheel 1.

The processing unit 4 computes a first rotation frequency F1 of the wheel 1, the first rotation frequency F1 being equal to:

$$F1 = \frac{\sqrt{\frac{VAL}{D1}}}{2\pi} \quad (1)$$

The processing unit 4 compares the determined first rotation frequency F1 to a first predetermined threshold TH1.

If the first rotation frequency F1 is smaller than the first threshold TH1 (step 11), the wheel 1 is considered as stopped.

Then step 10 is repeated after a predetermined duration, for example after 30 min.

The first threshold TH1 may be for example equal to 4.2 Hz.

If the first rotation frequency F1 is equal or greater than the first threshold TH1 (step 11), the wheel 1 is considered as moving.

The processing unit 4 defines a frequency analysis interval INT (step 12) comprising a lower bound LB and an upper bound UB.

The processing unit 4 defines the lower bound LB and the upper bound UB such that $$LB = F1 - TH2 \quad (2)$$

$$UB = F1 + TH2 \quad (3)$$

where TH2 is as second predetermined threshold. The second threshold TH2 may be for example equal to 2.5 Hz.

At step 13, the vibrations sensor 6 delivers a signal indicative of vibrations of the wheel 1 at the processing unit 4, the processing unit 4 processing a frequency analysis of the signal for the frequencies inside the frequency analysis interval INT.

The processing unit 4 implements for example a Goertzel algorithm to perform the frequency analysis.

At step 14, the processing unit 4 determines a second rotation frequency F2 of the wheel 1 from the processed frequency analysis.

The processing unit 4 selects the frequency in the frequency analysis interval INT having the higher amplitude, the second rotation frequency F2 being equal to the frequency having the higher amplitude.

The second rotation frequency F2 is equal to the rotating frequency $F_{wheel}$ of the wheel 1.

The processing unit 4 detects a failure of a bearing supporting the wheel 1 according to the value of the rotation frequency $F_{wheel}$ of the wheel 1 and the signal indicative of vibrations.

Then step 10 is repeated after a predetermined duration, for example after 30 min.

Figure 4:
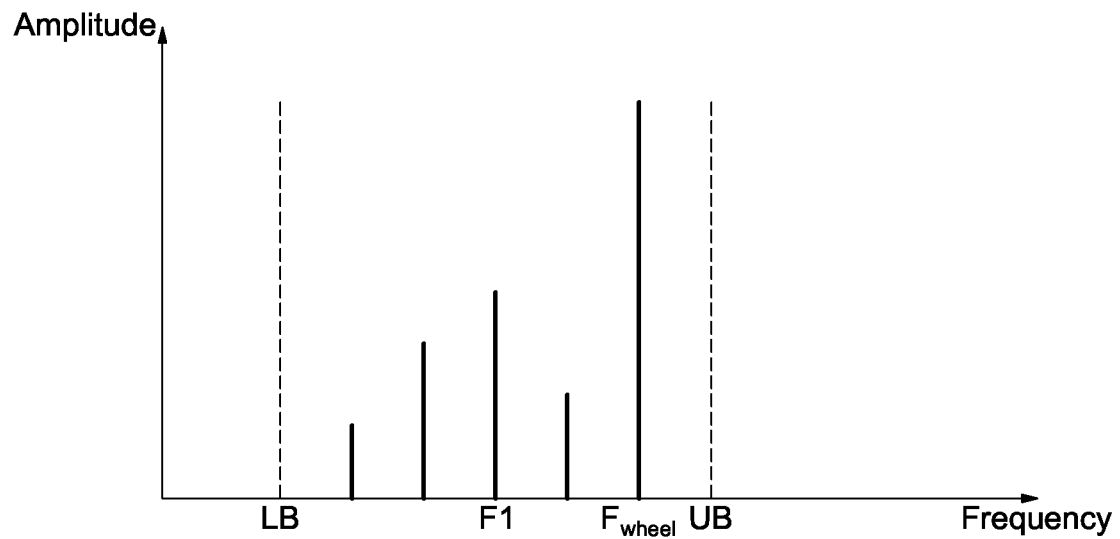
FIG. 4 illustrates an example of a frequency analysis according to the invention.

FIG. 4 discloses an example of a frequency analysis performed by the processing unit 4 comprising the rotating frequency $F_{wheel}$ of the wheel 1.

The processing unit 4 may transmit wirelessly the rotating frequency $F_{wheel}$ of the wheel 1 for example to another processing unit for example for vibration analysis or wheel speed comparison when the wheel 1 is moving.

The rotating frequency of the wheel 1 is reliably determined with an enhance accuracy for example of +/−0.5 Hz so that the bearing damage detection is more reliable.

Moreover, using the first measuring means to determine if the wheel 1 is moving consumes less energy than determining the rotating speed of the wheel 1 with the vibration sensor.

It permits to save energy in order to extend the operating time of the energy storage means and consequently the operating time of the device 2.

Additionally, performing the frequency analysis for the frequencies inside the frequency analysis interval INT reduces the computation time of the processing unit UT to save even more energy to extend the operating time of the device 2.

The invention claimed is:

1. A method for determining a rotation frequency of at least one wheel of a vehicle, the method comprising:
   determining a first rotation frequency of the at least one wheel from an acceleration value of the at least one wheel, comparing the determined first rotation frequency of the at least one wheel to a first predetermined threshold, defining a frequency analysis interval from the determined first rotation frequency greater than the first threshold, wherein the first threshold is 4.2 Hz, processing a frequency analysis of a signal indicative of vibrations of the at least one wheel for frequencies inside the frequency analysis interval, and selecting a second rotation frequency in the frequency analysis interval having the higher amplitude, the second rotation frequency being equal to the rotation frequency of the at least one wheel.

2. The method according to claim 1, wherein defining the frequency analysis interval comprises defining a lower bound of the frequency analysis interval and an upper bound of the frequency analysis interval, the lower bound being equal to the determined first rotation frequency minus a second predetermined threshold, and the upper bound being equal to the determined first rotation frequency plus the second threshold.

3. The method according to claim 1, wherein processing the frequency analysis comprises implementing a Goertzel algorithm.

4. The method according to claim 1, wherein determining a first rotation frequency comprises determining a first distance equal to the distance between the centre of the at least one wheel and first means for measuring the acceleration value, and computing the first acceleration value rotation frequency equal to $$\frac{\sqrt{\frac{\text{acceleration value}}{\text{first distance}}}}{2\pi}.$$

5. A device for determining the rotation frequency of at least one wheel of a vehicle comprising:

first measuring means for measuring an acceleration value of the at least one wheel, second measuring means for measuring vibrations of the at least one wheel, and a processing unit configured to:

determine a first rotation frequency of the at least one wheel from the measured acceleration value of the at least one wheel, compare the determined first rotation frequency of the at least one wheel to a first threshold, define a frequency analysis interval from the determined first rotation frequency greater than the first threshold, wherein the first threshold is 4.2 Hz, process a frequency analysis of a signal indicative of vibrations of the at least one wheel for the frequencies inside the frequency analysis interval, and select a second rotation frequency in the frequency analysis interval having a higher amplitude, the second rotation frequency being equal to the rotation frequency of the at least one wheel, measure a second acceleration value of the at least one wheel after a predetermined duration.

6. The device according to claim 5, wherein the processing unit is configured to define a lower bound of the frequency analysis interval and an upper bound of the frequency analysis interval, the lower bound being equal to the determined first rotation frequency minus a second threshold and the upper bound being equal to the determined first rotation frequency plus the second threshold.

7. The device according to claim 5, further comprising energy storage means for supplying energy to the process unit.

8. The device according to claim 5, wherein the processing unit is configured to transmit wirelessly the second rotation frequency.

9. The device according to claim 5, wherein the processing unit is configured to detect a failure of a bearing supporting the wheel according to the value of the rotation frequency of the at least one wheel and a signal indicative of vibrations delivered by the second measuring means.

10. A wheel of a vehicle comprising:

a device for determining the rotation frequency of at least one wheel providing first measuring means for measuring an acceleration value of the at least one wheel, second measuring means for measuring vibrations of the at least one wheel, and a processing unit configured to:

determine a first rotation frequency of the at least one wheel from the measured acceleration value of the at least one wheel, compare the determined first rotation frequency of the at least one wheel to a first threshold, wherein the first threshold is 4.2 Hz, define a frequency analysis interval from the determined first rotation frequency greater than the first threshold, process a frequency analysis of a signal indicative of vibrations of the at least one wheel for the frequencies inside the frequency analysis interval, and select a second rotation frequency in the frequency analysis interval having a higher amplitude, the second rotation frequency being equal to the rotation frequency of the at least one wheel.

* * * * *